(12) United States Patent
Leys

(10) Patent No.: US 7,063,304 B2
(45) Date of Patent: Jun. 20, 2006

(54) EXTENDED STROKE VALVE AND DIAPHRAGM

(75) Inventor: John A. Leys, Eden Prairie, MN (US)

(73) Assignee: Entegris, Inc., Chaska, MN (US)

( * ) Notice: Subject to any disclaimer, the term of this patent is extended or adjusted under 35 U.S.C. 154(b) by 0 days.

(21) Appl. No.: 10/886,938

(22) Filed: Jul. 8, 2004

(65) Prior Publication Data

US 2005/0006617 A1    Jan. 13, 2005

Related U.S. Application Data

(60) Provisional application No. 60/486,301, filed on Jul. 11, 2003, provisional application No. 60/486,959, filed on Jul. 14, 2003.

(51) Int. Cl.
*F16K 1/32* (2006.01)

(52) U.S. Cl. .................... 251/331; 251/335.2

(58) Field of Classification Search ........ 251/331, 251/335.2, 61.1, 61.5, 63.5, 63.6
See application file for complete search history.

(56) References Cited

U.S. PATENT DOCUMENTS

| | | |
|---|---|---|
| 2,691,773 A | 10/1954 | Lichtenberger |
| 2,734,526 A | 2/1956 | AAgaard |
| 2,939,676 A | 6/1960 | Kilcoin |
| 3,095,613 A | 7/1963 | Christensen et al. |
| 3,148,861 A | 9/1964 | McFarland, Jr. |
| 3,154,286 A | 10/1964 | McFarland, Jr. |
| 3,301,525 A | 1/1967 | Chernak et al. |
| 3,472,062 A | 10/1969 | Owen |
| 3,545,718 A | 12/1970 | Shale |
| 3,623,700 A | 11/1971 | Boteler |
| 3,792,720 A | 2/1974 | Robbins |
| 3,838,707 A | 10/1974 | Wachowitz, Jr. |
| 4,010,769 A | 3/1977 | De Lorenzo et al. |
| 4,022,114 A | 5/1977 | Hansen, III et al. |
| 4,027,849 A | 6/1977 | Muller |
| 4,147,824 A | 4/1979 | Dettmann et al. |
| 4,206,901 A | 6/1980 | Williams |
| 4,252,510 A | 2/1981 | Bromley |
| 4,298,330 A | 11/1981 | Davis |
| 4,327,891 A | 5/1982 | Allen et al. |
| 4,386,269 A | 5/1983 | Murphy |
| 4,436,690 A | 3/1984 | Davis |
| 4,596,268 A | 6/1986 | Jonas |
| 4,619,436 A | 10/1986 | Bonzer et al. |
| 4,676,853 A | 6/1987 | Lerma |
| 4,720,079 A | 1/1988 | Iizuka et al. |
| 4,794,940 A | 1/1989 | Albert et al. |
| 4,867,201 A * | 9/1989 | Carten .................. 251/331 |

(Continued)

FOREIGN PATENT DOCUMENTS

CA   1143357   3/1983

(Continued)

*Primary Examiner*—John Bastianelli
(74) *Attorney, Agent, or Firm*—Patterson, Thuente, Skaar & Christensen, P.A.

(57) ABSTRACT

An extended stroke poppet valve particularly suited for handling caustic fluids and having features enabling an extended service life for the valve. The valve includes a two part primary diaphragm assembly with a wetted diaphragm made from highly fatigue resistant fluoropolymer material, and a diaphragm backer made from high strength fluoropolymer material designed to withstand the high stress loads imposed by an extended valve stroke. The combination of these two layers in a single primary diaphragm assembly yields a highly durable, caustic chemical resistant, diaphragm capable of use in a long stroke poppet valve and having a relatively long service life.

30 Claims, 6 Drawing Sheets

U.S. PATENT DOCUMENTS

| | | | |
|---|---|---|---|
| 4,901,751 A * | 2/1990 | Story et al. ................. 251/331 |
| 4,994,781 A | 2/1991 | Sahagen |
| 5,002,086 A * | 3/1991 | Linder et al. ............ 251/335.2 |
| 5,088,329 A | 2/1992 | Sahagen |
| 5,137,026 A | 8/1992 | Waterson et al. |
| 5,145,336 A | 9/1992 | Becker et al. |
| 5,184,514 A | 2/1993 | Cucci et al. |
| 5,261,442 A | 11/1993 | Kingsford et al. |
| 5,284,425 A | 2/1994 | Holtermann et al. |
| 5,287,851 A | 2/1994 | Beran et al. |
| 5,291,822 A | 3/1994 | Alsobrooks et al. |
| 5,318,272 A | 6/1994 | Smith |
| 5,347,862 A | 9/1994 | Ingman |
| 5,386,849 A | 2/1995 | Gilchrist et al. |
| 5,419,530 A | 5/1995 | Kumar |
| 5,433,902 A | 7/1995 | Leyderman |
| 5,490,659 A | 2/1996 | Whiteside |
| 5,520,213 A | 5/1996 | Muller |
| 5,785,298 A | 7/1998 | Kumar |
| 5,924,441 A * | 7/1999 | Leys et al. ................. 251/335.2 |
| 5,967,173 A * | 10/1999 | Kingsford et al. ....... 251/335.2 |
| 6,000,416 A * | 12/1999 | Kingsford et al. ....... 251/335.2 |
| 6,006,728 A * | 12/1999 | Matsuda et al. ........ 251/129.17 |
| 6,007,045 A | 12/1999 | Heiniger et al. |
| 6,029,903 A * | 2/2000 | Fukano et al. .............. 251/331 |
| 6,030,694 A | 2/2000 | Dolan et al. |
| 6,047,947 A | 4/2000 | Kumar |
| 6,205,907 B1 | 3/2001 | Douglass |
| 6,230,609 B1 | 5/2001 | Bender et al. |
| 6,328,309 B1 | 12/2001 | Corbett, Jr. |
| 6,394,417 B1 * | 5/2002 | Browne et al. ............. 251/331 |
| 6,468,056 B1 | 10/2002 | Murakoshi |

FOREIGN PATENT DOCUMENTS

| | | |
|---|---|---|
| CA | 1257242 | 7/1989 |
| CN | 2056718 | 5/1990 |
| CN | 2073958 | 3/1991 |
| CN | 1063538 | 8/1992 |
| GB | 1 408 404 | 10/1975 |
| JP | 54132051 A | 10/1979 |
| JP | 59222676 A | 12/1984 |
| JP | 03212368 | 8/1991 |
| JP | 04-004369 | 1/1992 |
| JP | 04-004370 | 1/1992 |
| JP | 05-345126 | 12/1993 |
| JP | 09-210236 | 8/1997 |
| JP | 10-332002 | 12/1998 |
| JP | 11-118048 | 4/1999 |
| JP | 200310462 A | 11/2000 |
| JP | 2001-004045 | 1/2001 |

\* cited by examiner

EXTENDED STROKE VALVE AND DIAPHRAGM

RELATED APPLICATIONS

This application claims the benefit of U.S. Provisional Patent Application Ser. Nos. 60/486,301, filed Jul. 11, 2003, and 60/486,959, filed Jul. 14, 2003, each entitled "EXTENDED STROKE VALVE AND DIAPHRAGM" and each hereby fully incorporated herein by reference.

FIELD OF THE INVENTION

The present invention generally relates to valves, and more particularly to high-flow, extended stroke valves for controlling a flow of caustic fluids.

BACKGROUND OF THE INVENTION

Various types of valves are used in the semiconductor industry to control the flow of fluids, including highly caustic fluids. It is essential that these valves do not cause quiescent or dead spots in the fluid flow course which could cause the fluid to become stagnant and degrade or could trap solids resulting in the contamination of the fluid. Fluid flow rates in semiconductor fabrication sometimes must be of a significant quantity, and it is important that any valves used in a piping system do not cause undue pressure loss or restriction in flow rate. In addition, it is important that the number of potential leakage sources or seals be kept to a minimum due to the highly caustic fluids often used in the semiconductor industry.

These valves must be made of materials highly resistant to the caustic fluids. Contact of the caustic fluids with metal parts is generally to be avoided. The components which contact the fluids are typically formed of fluoropolymers such as perfluoroalkoxy (PFA), polyvinylidene (PVDF), or polytetrafluoroethylene (PTFE). Typically, the portions of the valve in direct contact with the fluid, such as the valve body, valve and valve seat, the primary diaphragm, and seals or gaskets will be formed from fluoropolymer material.

Flow restriction through a poppet valve may be lessened by increasing the gap between the valve and valve seat, usually by lifting the valve a greater distance with an extended stroke actuator. In valves using fluoropolymer diaphragms, however, a problem is that such diaphragms do not generally have a long fatigue life, tending to wear out in a relatively short time. Moreover, fluoropolymer diaphragms having sufficient flexibility to function properly with an extended stroke actuator can be delicate and may be easily overstressed, leading to premature failure of the valve. Valve failure in critical semiconductor processing operations may result in expensive delays in processing and damage to critical equipment and product.

What is still needed in the industry is an extended stroke poppet valve for caustic fluids having features enabling an extended service life for the valve.

SUMMARY OF THE INVENTION

An extended stroke poppet valve particularly suited for handling caustic fluids is provided according to the invention that has features enabling an extended service life for the valve as compared with previous valves. The valve includes a two part primary diaphragm assembly with a wetted diaphragm made from highly fatigue resistant fluoropolymer material, and a diaphragm backer made from high strength fluoropolymer material designed to withstand the high stress loads imposed by an extended valve stroke. The combination of these two layers in a single primary diaphragm assembly yields a highly durable, caustic chemical resistant, diaphragm capable of use in a long stroke poppet valve and having a relatively long service life. Durability and service life of the valve is improved as a direct result, leading to improved process efficiency and reduced cost.

Accordingly, the diaphragm valve includes a valve body defining an inlet passage, an outlet passage, and a fluid chamber. The fluid chamber has an inner wall and an open side. The inlet passage and the outlet passage form an opening in the inner wall so that the inlet passage, the outlet passage and the fluid chamber are fluidly communicable with each other. A valve seat portion surrounds the inlet passage opening in the fluid chamber. A flexible diaphragm assembly is positioned to sealingly close the open side of the fluid chamber. The flexible diaphragm has a valve portion facing into the fluid chamber, and is selectively positionable in at least a valve closed position wherein the valve portion is sealingly engaged with the valve seat portion to block fluid flow through the valve, and a valve open position wherein the valve portion is spaced apart from the valve seat to enable fluid flow through the valve. The flexible diaphragm assembly includes a primary diaphragm assembly with a primary diaphragm member formed from fatigue resistant fluoropolymer material, and a contiguous diaphragm backer member formed from high strength fluoropolymer material. The diaphragm assembly may further include a secondary diaphragm spaced apart from the primary diaphragm assembly. The valve may also include an actuator assembly operably coupled with the flexible diaphragm assembly for selectively positioning the flexible diaphragm assembly in the valve open and the valve closed positions.

DETAILED DESCRIPTION OF THE INVENTION

Figure 1:
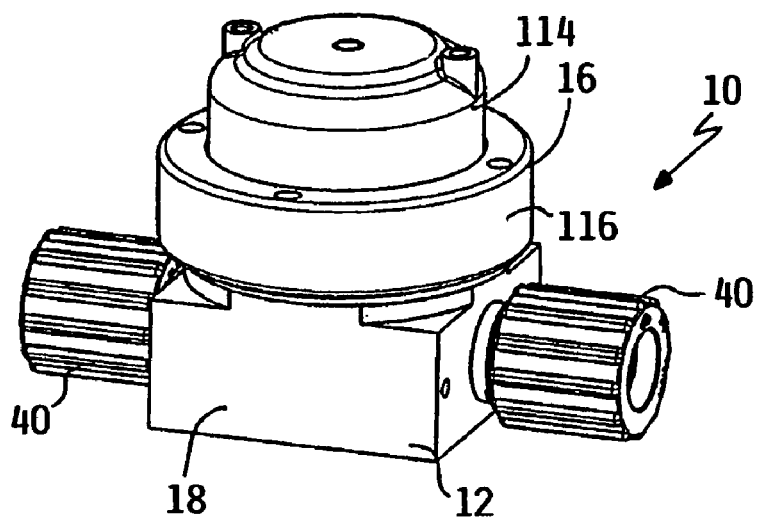
FIG. 1 is a perspective view of a valve according to the invention.
Figure 2:
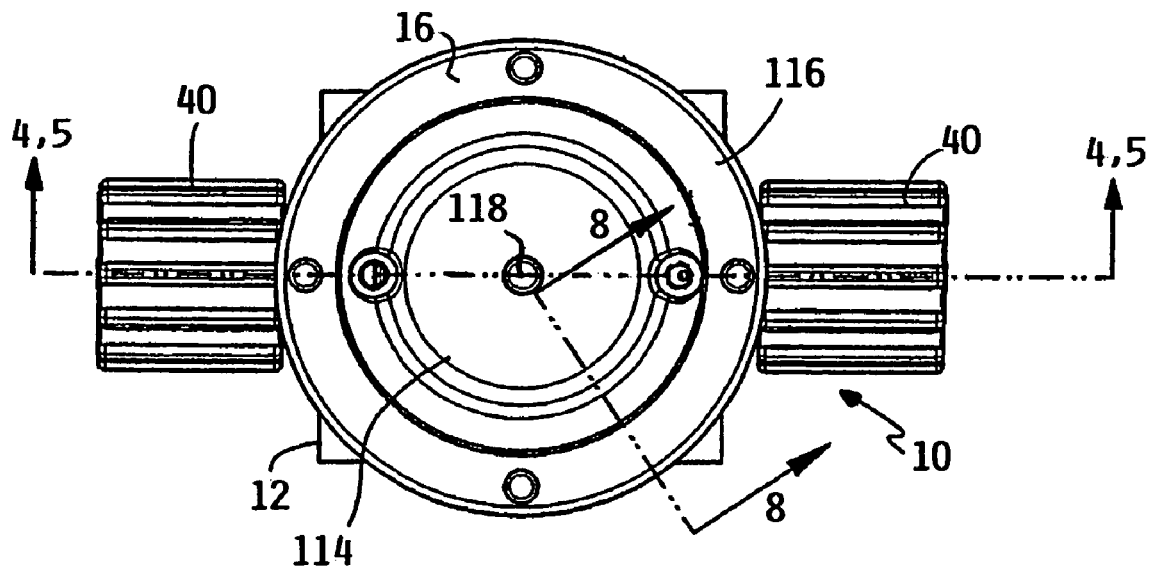
FIG. 2 is a top plan view of the valve depicted in FIG. 1.
Figure 3:
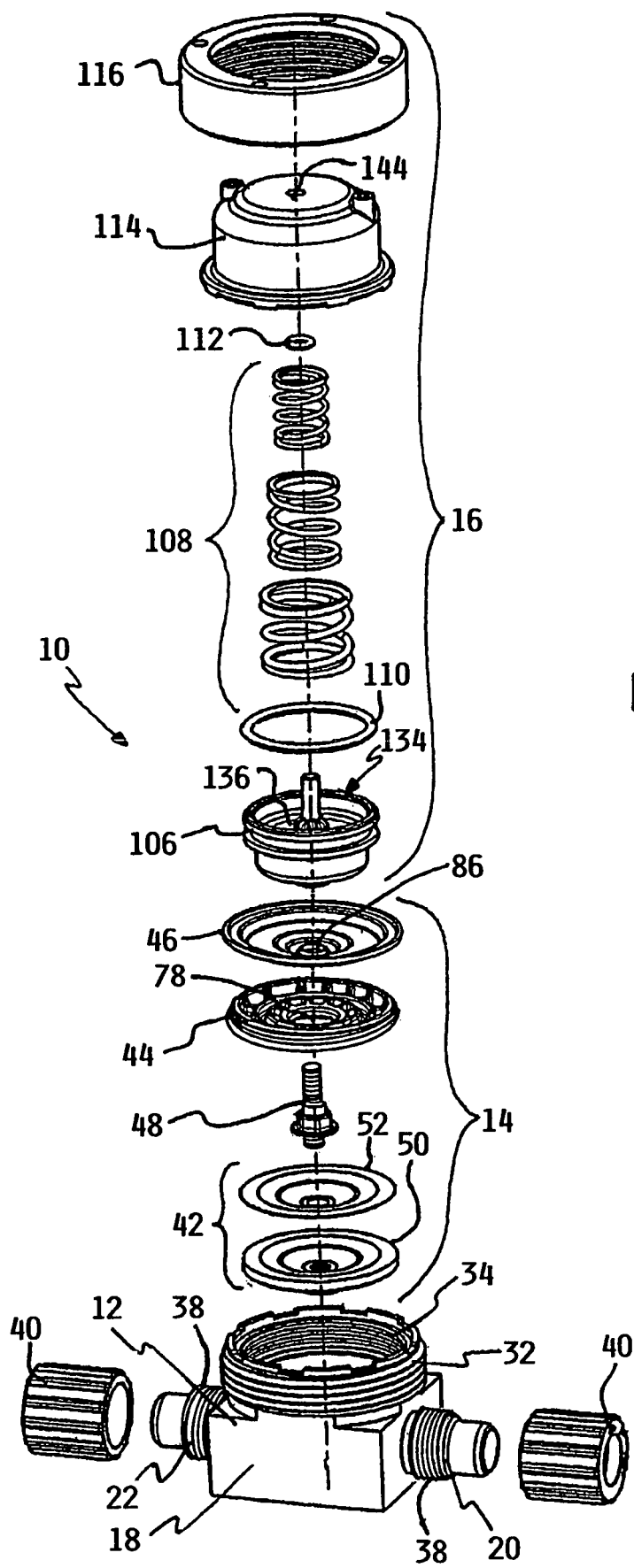
FIG. 3 is an exploded view of a valve according to the invention.
Figure 4:
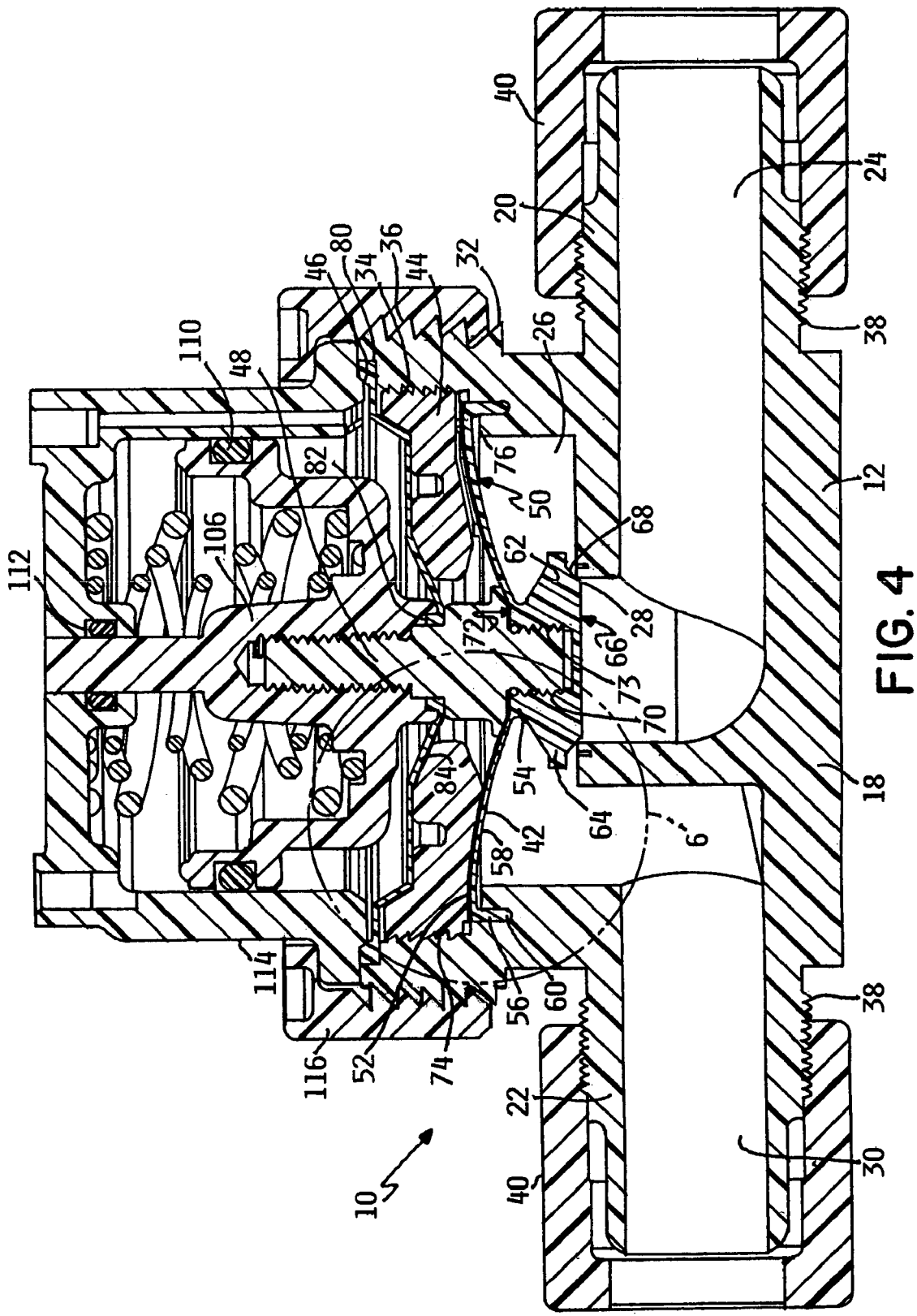
FIG. 4 is a cross-sectional view taken through section 4—4 of FIG. 2 depicting the valve in a valve closed position.
Figure 5:
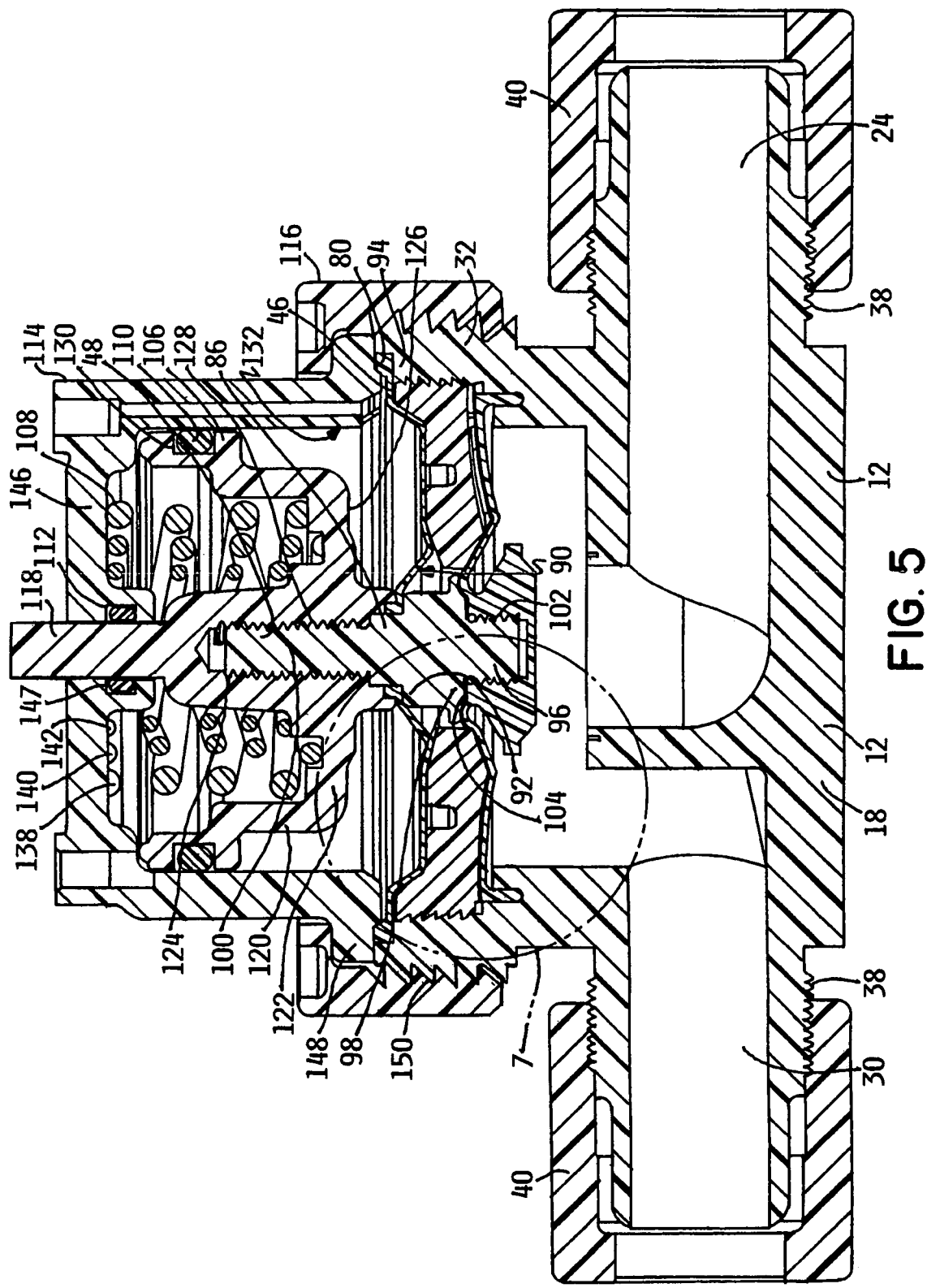
FIG. 5 is a cross-sectional view taken through section 5—5 of FIG. 2 depicting the valve in a valve open position.

Extended stroke valve 10 generally includes body 12, diaphragm assembly 14, and actuator assembly 16. Body 12 has a central portion 18 with a pair of projecting nipples 20, 22. Inlet passage 24 extends from nipple 20 into central portion 18, turning upward and terminating in fluid chamber 26. Valve seat 28 surrounds the termination of inlet passage 24 in fluid chamber 26. Outlet passage 30 extends from fluid chamber 26 through central portion 18 and nipple 22.

Mating ring 32 extends upwardly from central portion 18, and has inner threaded region 34 and outer threaded region 36 for receiving diaphragm assembly 14 and actuator assembly 16 as further described hereinbelow. Each of nipples 20, 22, has a threaded region 38 for receiving a threaded compression fitting sleeve 40 so that valve 10 may be attached to piping or tubing (not depicted). Alternatively, of course, any other type of fitting or connection may be used to connect piping or tubing to valve 10, including flare connections, straight threaded connections, or welding.

Diaphragm assembly 14 generally includes primary diaphragm assembly 42, diaphragm retainer 44, secondary diaphragm 46, and stem 48. Primary diaphragm assembly 42 generally includes wetted diaphragm 50 and diaphragm backer 52. Wetted diaphragm 50 is preferably formed from highly fatigue resistant fluoropolymer material, preferably PTFE material. The currently most preferred material for wetted diaphragm 50 is Daikin M112, made by Daikin Industries, Ltd. of Japan. Another preferred material is "HyQ" PTFE. Diaphragm backer 52 is preferably formed from high strength modified fluoropolymer material, preferably PTFE material. The currently most preferred material for diaphragm backer 52 is GORE-TEX® made by W.L. Gore & Associates, Inc. of Newark, Del. Of course, it will be readily appreciated that, as an alternative, wetted diaphragm 50 may be made from the high strength modified fluoropolymer material and diaphragm backer 52 may be made from the highly fatigue resistant fluoropolymer material.

Wetted diaphragm 50 has center portion 54 and peripheral ring 56 connected by a thin, flexible portion 58. Peripheral ring 56 is sealingly received in upwardly facing groove 60 of central portion 18 of body 12. Valve member 62 projects downwardly from center portion 54 and has an enlarged head 64 with a bottom surface 66. Inclined sealing portion 68 is formed on bottom surface 66, and is positioned and sized to sealingly mate with valve seat 28. Recess 70 is formed in top surface 72 of center portion 54, and has interior threads 73 for receiving stem 48 as further described hereinbelow.

Figure 6:
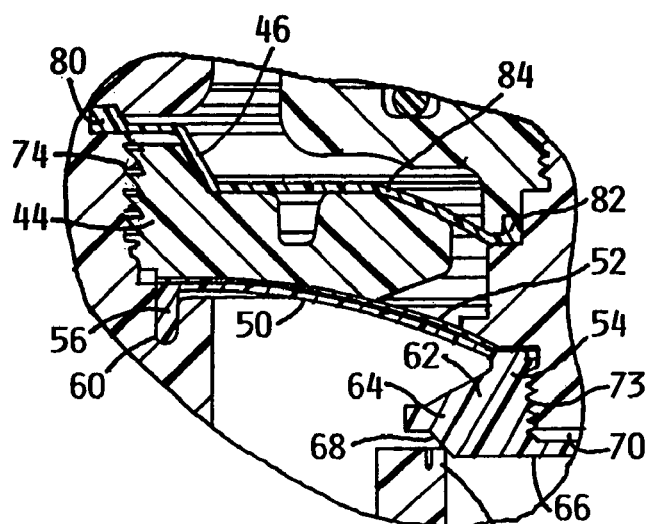
FIG. 6 is an enlarged cross-sectional view of a portion of FIG. 4.
Figure 7:
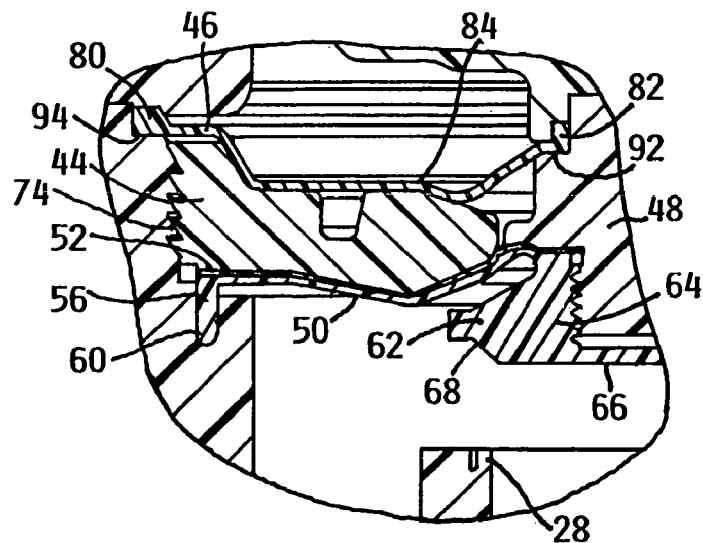
FIG. 7 is an enlarged cross-sectional view of a portion of FIG. 5.
Figure 8:
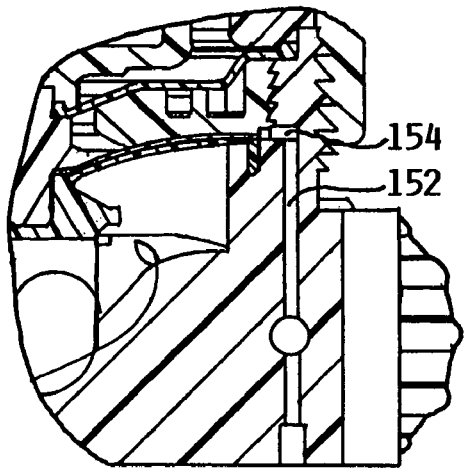
FIG. 8 is a cross-sectional view taken through section 8—8 of FIG. 2.

Diaphragm retainer 44 has exterior threaded region 74 and threads into inner threaded region 34 of mating ring 32. Wetted diaphragm 50 and diaphragm backer 52 are captured between diaphragm retainer 44 and shoulder 76 of body 12 as depicted best in FIGS. 6 and 7. Peripheral ring 56 is pressed into groove 60 as diaphragm retainer 44 is tightened, thereby forming a seal at the periphery of primary diaphragm assembly 42. Diaphragm retainer 44 has a central aperture 78. Stem 48 extends through central aperture 78 to engage recess 70.

Secondary diaphragm 46 covers diaphragm retainer 44, and has a peripheral ring 80 and a center ring 82 connected by a thin flexible portion 84. Aperture 86 in center ring 82 fits over and engages intermediate portion 88 of stem 48. Bottom surface 90 of secondary diaphragm 46 engages shoulder 92 of stem 48, while peripheral ring 80 fits into upper shoulder 94 of mating ring 32. Secondary diaphragm 46 serves as an upper containment barrier in the event of leakage through primary diaphragm assembly 42, and may be made from any suitably flexible, fatigue resistant material having appropriate strength properties. It is currently most preferred that a composite of PTFE, fabric, and fluoroelastomer material be used for secondary diaphragm 46. The preferred fluoroelastomer material is Viton® made by DuPont Dow Elastomers L.L.P. of Wilmington, Del.

Stem 48 has a lower threaded portion 96, enlarged portion 98, stepped intermediate portion 88, and upper threaded portion 100. Lower threaded portion 96 has exterior threads 102 for engaging the interior threads 73 of recess 70 in primary diaphragm assembly 42. Enlarged portion 98 has a bottom surface 104 bearing on top surface 72 of primary diaphragm assembly 42. Upper threaded portion 100 engages with actuator assembly 16 as further described herein.

Actuator assembly 16 generally includes piston 106, spring package 108, sealing rings 110, 112, housing 114 and retainer ring 116. Piston 106 is slidably disposed in housing 114, and generally includes stem portion 118, and skirt 120, connected by web portion 122. Stem portion 118 has bore 124 extending from bottom side 126. Bore 124 may have internal threads 128 for receiving upper threaded portion 100 of stem 48. Skirt 120 has peripheral groove 130, which is dimensioned so as to receive sealing ring 110, which forms a sliding seal with inner wall 132 of housing 114. Stem portion 118, web portion 122, and skirt 120 are preferably oriented so that piston 106 is cup shaped with an upwardly directed recess 134. Spring package 108 fits within recess 134, and bears against inner surface 136 of recess 134 and inner wall 132 of housing 114 so as to apply a downward bias to piston 106 and diaphragm assembly 14. In the depicted embodiment, spring package 108 includes an outer spring 138, an intermediate spring 140, and an inner spring 142. It will be readily appreciated, however, that spring package 108 may include any number and configuration of springs consistent with the fluid pressure used with the valve and the characteristics of the particular actuator used with valve 10. It will also be readily appreciated that, although a normally closed type valve configuration is depicted herein, the diaphragm assembly 14 of the present invention would also be applicable in a normally open type valve design.

Housing 114 has aperture 144 in top wall 146. Stem portion 118 of piston 106 extends through and slides within aperture 144. Sealing ring 112 fits over stem portion 118 and is received in peripheral groove 147. Sealing ring 112 functions to prevent leakage through aperture 144 and around stem portion 118. Housing 114 also has a peripheral flange 148 which is engaged by retainer ring 116. Retainer ring 116 has internal threads 150, which engage outer threaded region 36 of mating ring 32 to retain actuator assembly 16 to body 12. A powered or manual actuator device (not depicted) may be engaged with stem portion 118 so as to enable selective movement of piston 106 within housing 114.

A tell-tale leakage port 152 may be provided, extending from a region 154 at the periphery of primary diaphragm assembly 42 to provide an indication of fluid leakage through or past the primary diaphragm assembly 42. Tell-tale leakage port 152 may be sealed with a small fluoropolymer plug (not depicted) that is expelled by the fluid pressure exerted by leakage. Further, as depicted in FIG. 9, a nipple 153 may be provided to enable tubing (not depicted) to be connected so that any fluid leaking through leakage port 152 may be routed away from the vicinity of valve 10.

In operation, spring package 108 normally biases piston 106 and diaphragm assembly 14 downward in a valve closed position, so that valve member 62 is sealingly engaged with valve seat 28, closing off fluid flow through valve 10. Piston 106 may then be selectively positioned upward against the bias of spring package 108 so as to move valve member 62 into a valve open position away from valve seat 28, thereby enabling fluid to flow through inlet passage 24, fluid chamber 26 and outlet passage 30. Thus, diaphragm assembly 14 and valve member 62 is selectively positionable in a valve open and a valve closed position.

Figure 9:
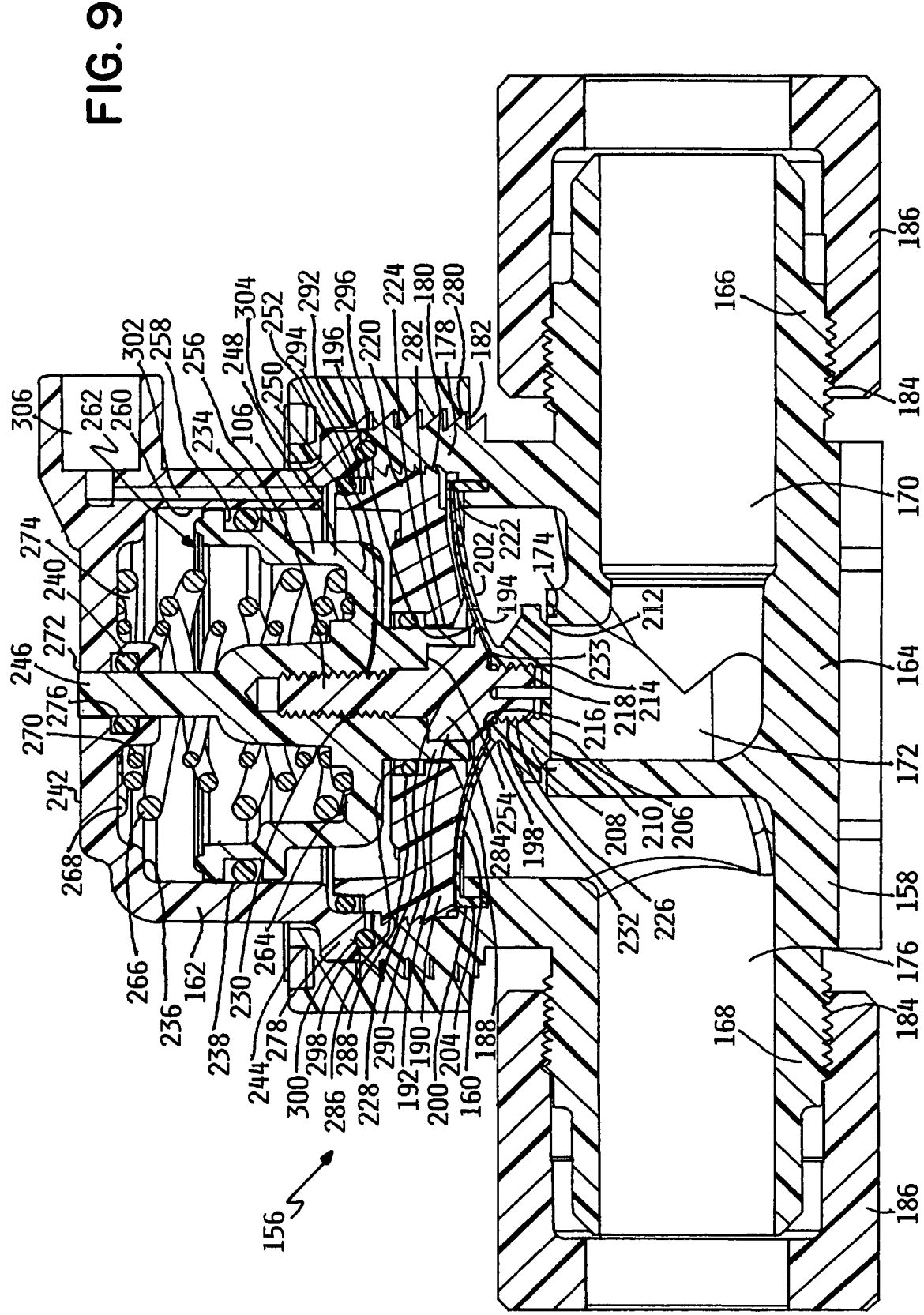
FIG. 9 is a cross-sectional view of an alternative embodiment of the valve of the present invention.

An alternative embodiment of an extended stroke valve 156 is depicted in FIG. 9. Valve 156 generally includes body 158, diaphragm assembly 160, and actuator assembly 162. Body 158 has a central portion 164 with a pair of projecting nipples 166, 168. Inlet passage 170 extends from nipple 166 into central portion 164, turning upward and terminating in fluid chamber 172. Valve seat 174 surrounds the termination of inlet passage 170 in fluid chamber 172. Outlet passage 176 extends from fluid chamber 172 through central portion 164 and nipple 168. Mating ring 178 extends upwardly from central portion 164, and has inner threaded region 180 and outer threaded region 182 for receiving diaphragm assembly 160 and actuator assembly 162 as before. Again, each of nipples 166, 168, may have a threaded region 184 for receiving a threaded compression fitting sleeve 186.

Diaphragm assembly 160 generally includes wetted diaphragm assembly 188, diaphragm retainer 190, and stem 192. Primary diaphragm assembly 188 generally includes wetted diaphragm 194 and diaphragm backer 196. Again, wetted diaphragm 194 is preferably formed from highly fatigue resistant fluoropolymer material, preferably PTFE material such as Daikin M112 or "HyQ" PTFE. Diaphragm backer 196 is preferably formed from high strength modified fluoropolymer material, preferably PTFE such as GORE-TEX®.

Wetted diaphragm 194 has center portion 198 and peripheral ring 200 connected by a thin, flexible portion 202. Peripheral ring 200 is sealingly received in upwardly facing groove 204 of central portion 164 of body 158. Valve member 206 projects downwardly from center portion 198 and has an enlarged head 208 with a bottom surface 210. Inclined sealing portion 212 is formed on bottom surface 210, and is positioned and sized to sealingly mate with valve seat 174. Recess 214 is formed in top surface 216 of center portion 198, and has interior threads 218 for receiving stem 192.

Diaphragm retainer 190 has exterior threaded region 220 and threads into inner threaded region 180 of mating ring 178. Wetted diaphragm 194 and diaphragm backer 196 are captured between diaphragm retainer 190 and shoulder 222 of body 158. Peripheral ring 200 is pressed into groove 204 as diaphragm retainer 190 is tightened, thereby forming a seal at the periphery of wetted diaphragm assembly 188. Diaphragm retainer 190 has a central aperture 224. Stem 192 extends through central aperture 224 to engage recess 214.

Stem 192 has a lower threaded portion 226, enlarged portion 228, and upper threaded portion 230. Lower threaded portion 226 has exterior threads 232 for engaging the interior threads 218 of recess 214 in wetted diaphragm assembly 188. Enlarged portion 228 has a bottom surface 232 bearing on top surface 216 of wetted diaphragm assembly 188. Upper threaded portion 230 engages with actuator assembly 16 as further described herein.

Actuator assembly 162 generally includes piston 234, spring package 236, sealing rings 238, 240, housing 242 and retainer ring 244. Piston 234 is slidably disposed in housing 242, and generally includes stem portion 246, and skirt 248, connected by web portion 250. Stem portion 246 has bore 252 extending from bottom side 254. Bore 252 may have internal threads 256 for receiving upper threaded portion 230 of stem 192. Skirt 248 has peripheral groove 258, which is dimensioned so as to receive sealing ring 238, which forms a sliding seal with inner wall 260 of housing 242. Stem portion 246, web portion 250, and skirt 248 are preferably oriented so that piston 234 is cup shaped with an upwardly directed recess 262. Spring package 236 fits within recess 262, and bears against inner surface 264 of recess 262 and inner wall 260 of housing 242 so as to apply a downward bias to piston 234 and diaphragm assembly 160. In the depicted embodiment, spring package 236 includes an outer spring 266, an intermediate spring 268, and an inner spring 270. It will be readily appreciated, however, that spring package 236 may include any number and configuration of springs consistent with the fluid pressure used with the valve and the characteristics of the particular actuator used with valve 156. It will also be readily appreciated that, although a normally closed type valve configuration is depicted herein, the diaphragm assembly 160 of the present invention would also be applicable in a normally open type valve design.

Housing 242 has aperture 272 in top wall 274. Stem portion 246 of piston 234 extends through and slides within aperture 272. Sealing ring 240 fits over stem portion 246 and is received in peripheral groove 276. Sealing ring 240 functions to prevent leakage through aperture 272 and around stem portion 246. Housing 242 also has a peripheral flange 278 which is engaged by retainer ring 244. Retainer ring 244 has internal threads 280, which engage outer threaded region 182 of mating ring 178 to retain actuator assembly 162 to body 158. A powered or manual actuator device (not depicted) may be engaged with stem portion 246 so as to enable selective movement of piston 234 within housing 242.

In the embodiment depicted in FIG. 9, secondary containment is provided with o-rings. Piston 234 has downwardly depending skirt portion 282 defining recess 284. Enlarged portion 228 of stem 192 is received in recess 284. Diaphragm retainer 190 has upwardly facing recess 286. O-ring 288 is fitted in recess 286 and around the outer surface 290 of skirt portion 282. Further, diaphragm retainer 190 has outwardly facing recess 292 to receive o-ring 294 between diaphragm retainer 190 and inner wall 260 of housing 242. Further, mating ring 178 of body 158 has a recess 246 in upper surface 298 to receive o-ring 300 between mating ring 178 and housing 242. These O-rings 288, 294, 300, provide additional containment against leakage from a rupture or seepage of fluid through wetted diaphragm assembly 194.

A tell-tale leakage port 302 may be provided, extending from a region 304 at the periphery of wetted diaphragm assembly 194 to provide an indication of fluid leakage through or past the wetted diaphragm assembly 194. Tell-tale leakage port 302 may be sealed with a small fluoropolymer plug (not depicted) that is expelled by the fluid pressure exerted by leakage. Further, a fitting 306 may be provided to enable tubing (not depicted) to be connected so that any fluid leaking through leakage port 302 may be routed away from the vicinity of valve 152.

The diaphragm assembly 14, 160 of the present invention possesses significant advantages over the prior art. The two part construction of primary/wetted diaphragm assembly 42, 188 includes a wetted diaphragm made from highly fatigue resistant fluoropolymer material, and a diaphragm backer made from high strength fluoropolymer material designed to withstand the high stress loads imposed by an extended valve stroke. The combination of these two layers in a single primary diaphragm assembly yields a highly durable, caustic chemical resistant, diaphragm capable of use in a long stroke poppet valve and having a relatively long service life. Durability and service life of the valve is improved as a direct result, leading to improved process efficiency and reduced cost. Although a two position, normally closed, 2-way poppet valve is depicted herein, it will be readily appreciated that the diaphragm assembly of the present invention is adaptable to a wide variety of extended stroke valve configurations including normally open and three and four way valves.

What is claimed is:

1. A diaphragm valve comprising:
   a valve body defining an inlet passage, an outlet passage, and a fluid chamber with an inner wall and an open side, each of said inlet passage and said outlet passage forming an opening in said inner wall so that said inlet passage, said outlet passage and said fluid chamber are fluidly communicable with each other;
   a valve seat portion surrounding the inlet passage opening in the fluid chamber;
   a flexible diaphragm assembly sealingly closing the open side of said fluid chamber and having a valve portion facing into said fluid chamber, said flexible diaphragm assembly selectively shiftable between at least a valve closed position wherein said valve portion is sealingly engaged with said valve seat portion to block fluid flow through said valve, and a valve open position wherein said valve portion is spaced apart from said valve seat to enable fluid flow through said valve, said flexible diaphragm assembly including a primary diaphragm assembly comprising a primary diaphragm member presenting a pair of opposing surfaces and being formed from thin fatigue resistant fluoropolymer material, and a diaphragm backer member contiguous and substantially coextensive with one of the pair of opposing surfaces of the primary diaphragm member, the diaphragm backer member formed from thin high strength fluoropolymer material, said flexible diaphragm assembly further including a secondary diaphragm spaced apart from said primary diaphragm assembly; and
   an actuator assembly operably coupled with said flexible diaphragm assembly for selectively positioning said flexible diaphragm assembly in each of said valve open and said valve closed positions.

2. The diaphragm valve of claim 1, wherein said high strength fluoropolymer material is PTFE.

3. The diaphragm valve of claim 1, wherein said fatigue resistant fluoropolymer material is PTFE.

4. The diaphragm valve of claim 1, wherein said valve body is formed from PTFE material.

5. The diaphragm valve of claim 1, wherein said actuator assembly includes a housing operably coupled with said valve body and a piston slidably disposed in said housing.

6. The diaphragm valve of claim 5, wherein said actuator assembly further includes a spring package for biasing said piston so that said actuator assembly is biased toward one of said valve open or said valve closed positions.

7. The diaphragm valve of claim 5, wherein said valve includes a diaphragm retainer for retaining the flexible diaphragm assembly in the valve.

8. The diaphragm valve of claim 7, wherein the diaphragm retainer has a central aperture, wherein a portion of the piston is slidably disposed in the central aperture of the diaphragm retainer, and wherein the valve further comprises a pair of o-rings, one of the pair of o-rings sealingly disposed between the piston and an inner wall of the housing, and the other of the pair of o-rings sealingly disposed in the central aperture between the diaphragm retainer and the portion of the piston extending therethrough.

9. The diaphragm valve of claim 5, wherein the secondary diaphragm is disposed above the primary diaphragm assembly.

10. A diaphragm valve comprising:
    a valve body defining an inlet passage, an outlet passage, and a fluid chamber with an inner wall and an open side, each of said inlet passage and said outlet passage forming an opening in said inner wall so that said inlet passage, said outlet passage and said fluid chamber are fluidly communicable with each other defining a flow path;
    valve seat means in the fluid chamber and positioned in said flow path;
    diaphragm means for sealingly closing the open side of said fluid chamber, the diaphragm means having valve means selectively engagable with said valve seat means, said valve means selectively shiftable between at least a closed position wherein said valve means blocks said flow path, and an open position wherein said valve means is spaced apart from said valve seat means so that said flow path is not blocked, said diaphragm means including at least one primary diaphragm member presenting a pair of opposing surfaces and being formed from thin fatigue resistant fluoropolymer material and a diaphragm backer member contiguous and substantially coextensive with one of the pair of opposing surfaces of the primary diaphragm member, the diaphragm backer member formed from thin high strength fluoropolymer material; and
    actuator means operably coupled with said diaphragm means for selectively positioning said diaphragm means in each of said valve open and said valve closed positions.

11. The diaphragm valve of claim 10, wherein said high strength fluoropolymer material is PTFE.

12. The diaphragm valve of claim 10, wherein said fatigue resistant fluoropolymer material is PTFE.

13. The diaphragm valve of claim 10, wherein said valve body is formed from PTFE material.

14. The diaphragm valve of claim 10, wherein said actuator means includes a housing operably coupled with said valve body and a piston slidably disposed in said housing.

15. The diaphragm valve of claim 14, wherein said actuator means further includes a spring package for biasing said piston so that said actuator means is biased toward one of said valve open or said valve closed positions.

16. The diaphragm valve of claim 10, wherein said diaphragm means includes a secondary diaphragm spaced apart from said primary diaphragm member.

17. A diaphragm valve made by a process comprising steps of:
    providing a valve body defining an inlet passage, an outlet passage, and a fluid chamber with an inner wall and an open side, each of said inlet passage and said outlet passage forming an opening in said inner wall so that said inlet passage, said outlet passage and said fluid chamber are fluidly communicable with each other; said valve body further including a valve seat portion surrounding the inlet passage opening in the fluid chamber;
    forming a flexible diaphragm assembly for sealingly closing the open side of said fluid chamber, said diaphragm assembly having a valve portion facing into said fluid chamber, said flexible diaphragm assembly selectively positionable in at least a valve closed position wherein said valve portion is sealingly engaged with said valve seat portion to block fluid flow through said valve, and a valve open position wherein said valve portion is spaced apart from said valve seat to enable fluid flow through said valve, said flexible diaphragm assembly including a primary diaphragm assembly comprising a primary diaphragm member presenting a pair of opposing surfaces and being formed from thin fatigue resistant fluoropolymer material, and a diaphragm backer member contiguous and substantially coextensive with one of the pair of opposing surfaces of the primary diaphragm member, the diaphragm backer member formed from thin high strength fluoropolymer material, said flexible diaphragm assembly further including a secondary diaphragm spaced apart from said primary diaphragm assembly; and sealingly engaging said flexible diaphragm assembly with said valve body so as to close the open side of said fluid chamber.

18. The diaphragm valve of claim 17, wherein the process of making the valve further comprises the steps of providing an actuator assembly for selectively positioning said flexible diaphragm assembly and operably coupled said actuator assembly with said flexible diaphragm assembly.

19. A diaphragm valve comprising:
  (a) a valve body defining an inlet and an outlet;
  (b) a valve seat positioned between said inlet and outlet; and
  (c) a diaphragm structure including a primary diaphragm and a secondary diaphragm, said primary diaphragm having a valve portion selectively engageable with said valve seat to block fluid flow through said inlet and outlet, said primary diaphragm comprising a primary diaphragm member presenting a pair of opposing surfaces and a diaphragm backer member contiguous and substantially coextensive with one of the pair of opposing surfaces of the primary diaphragm member, wherein one of said primary diaphragm member and said diaphragm backer member is formed from thin high strength fluoropolymer material and the other is formed from thin fatigue resistant fluoropolymer material.

20. The diaphragm valve of claim 19, wherein said high strength fluoropolymer material is PTFE.

21. The diaphragm valve of claim 19, wherein said fatigue resistant fluoropolymer material is PTFE.

22. The diaphragm valve of claim 19, wherein said valve body is formed from PTFE material.

23. The diaphragm valve of claim 19 further comprising an actuator assembly operably coupled with said diaphragm structure for selectively positioning said diaphragm structure to block flow through said valve.

24. The diaphragm valve of claim 23, wherein said actuator assembly includes a housing operably coupled with said valve body and a piston slidably disposed in said housing.

25. The diaphragm valve of claim 24, wherein said actuator assembly further includes a spring package for biasing said piston so that said actuator assembly is biased toward one of said valve open or said valve closed positions.

26. A diaphragm valve comprising:
  (a) a valve body defining an inlet and an outlet;
  (b) a valve seat positioned between said inlet and outlet;
  (c) a wetted diaphragm assembly having a valve portion selectively engageable with said valve seat to block fluid flow through said inlet and outlet, said wetted diaphragm assembly comprising a primary diaphragm member presenting a pair of opposing surfaces and a diaphragm backer member contiguous and substantially coextensive with one of the pair of opposing surfaces of the primary diaphragm member, wherein one of said primary diaphragm member and said diaphragm backer member is formed from thin high strength fluoropolymer material and the other is formed from thin fatigue resistant fluoropolymer material;
  (d) a housing operably coupled with said valve body with a piston slidably disposed in said housing, the piston operably coupled with the wetted diaphragm assembly so that the wetted diaphragm assembly is selectively positionable with the piston;
  (e) a diaphragm retainer operably coupled with the body for retaining the wetted diaphragm assembly in the valve, the diaphragm retainer having a central aperture, a portion of the piston being slidably disposed in the central aperture of the diaphragm retainer; and
  (f) a pair of o-rings, one of the pair of o-rings sealingly disposed between the piston and an inner wall of the housing, and the other of the pair of o-rings sealingly disposed in the central aperture between the diaphragm retainer and the portion of the piston extending therethrough.

27. The diaphragm valve of claim 26, wherein said high strength fluoropolymer material is PTFE.

28. The diaphragm valve of claim 26, wherein said fatigue resistant fluoropolymer material is PTFE.

29. The diaphragm valve of claim 26, wherein said valve body is formed from PTFE material.

30. The diaphragm valve of claim 19 further comprising an actuator operably coupled with said piston for selectively positioning said wetted diaphragm assembly to block flow through said valve.

* * * * *